(12) United States Patent
Karri et al.

(10) Patent No.: US 11,755,218 B1
(45) Date of Patent: Sep. 12, 2023

(54) SYSTEM AND METHOD FOR ADAPTIVE DATA COMPRESSION

(71) Applicant: EMC IP Holding Company, LLC, Hopkinton, MA (US)

(72) Inventors: Ajay Karri, South Grafton, MA (US); Vamsi Vankamamidi, Hopkinton, MA (US); Oran Asher Baruch, Tel Aviv-Jaffa (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/727,080

(22) Filed: Apr. 22, 2022

(51) Int. Cl.
*G06F 3/06* (2006.01)

(52) U.S. Cl.
CPC .............. *G06F 3/064* (2013.01); *G06F 3/067* (2013.01); *G06F 3/0613* (2013.01)

(58) Field of Classification Search
None
See application file for complete search history.

(56) References Cited

U.S. PATENT DOCUMENTS

| 10,635,315 | B1* | 4/2020 | Armangau | G06F 3/0641 |
| 2020/0341907 | A1* | 10/2020 | Shveidel | G06F 3/0604 |

* cited by examiner

*Primary Examiner* — Brian R Peugh
(74) *Attorney, Agent, or Firm* — Brian J. Colandreo; Heath M. Sargeant; Holland & Knight LLP

(57) ABSTRACT

A method, computer program product, and computing system for receiving a plurality of physical layer blocks (PLBs). A subset of PLBs may be selected from the plurality of PLBs for combining into a combined PLB based upon, at least in part, a utilization of each PLB of the plurality of PLBs, an average compression per active virtual, and a number of free PLBs generated when combining into the combined PLB. One or more PLBs of the subset of PLBs may be compressed based upon, at least in part, the average compression per active virtual. The one or more PLBs of the subset of PLBs may be combined into the combined PLB.

20 Claims, 7 Drawing Sheets

SYSTEM AND METHOD FOR ADAPTIVE DATA COMPRESSION

BACKGROUND

Storing and safeguarding electronic content may be beneficial in modern business and elsewhere. Accordingly, various methodologies may be employed to protect and distribute such electronic content.

For example, in a log structured file system, data may be written or persisted to a log structure before flushing the data to persistent storage. However, limitations in the bandwidth of the log may become a bottleneck for processing operations on a storage system. Conventional approaches seek to resolve this by writing data to the log with minimal processing on the data. For example, conventional approaches delay data reduction operations until the data is persisted. However, these approaches typically perform compression and deduplication separately.

SUMMARY OF DISCLOSURE

In one example implementation, a computer-implemented method executed on a computing device may include, but is not limited to, receiving a plurality of physical layer blocks (PLBs). A subset of PLBs may be selected from the plurality of PLBs for combining into a combined PLB based upon, at least in part, a utilization of each PLB of the plurality of PLBs, an average compression per active virtual, and a number of free PLBs generated when combining into the combined PLB. One or more PLBs of the subset of PLBs may be compressed based upon, at least in part, the average compression per active virtual. The one or more PLBs of the subset of PLBs may be combined into the combined PLB.

One or more of the following example features may be included. A plurality of active virtuals may be configured to map to each PLB. The utilization of each PLB may be based upon, at least in part, the number of active virtuals mapping to each PLB. Selecting a subset of PLBs from the plurality of PLBs for combining into a combined PLB may include maximizing the number of free PLBs generated when combining into the combined PLB. Compressing one or more PLBs of the subset of PLBs based upon, at least in part, the average compression per active virtual may include compressing a first PLB from the subset of PLBs; determining the average compression per active virtual based upon, at least in part, the compression of the first PLB; selecting a candidate PLB from the subset of PLBs for combining into the combined PLB based upon, at least in part the average compression per active virtual and a remaining capacity of the combined PLB, thus defining a second PLB; compressing the second PLB; determining an updated average compression per active virtual based upon, the compression of the second PLB; and combining the compressed first PLB and the compressed second PLB into the combined PLB. Candidate PLBs may be iteratively selected and compressed from the subset of PLBs based upon, at least in part, the remaining capacity of the combined PLB. The average compression per active virtual used for selecting the subset of PLBs from the plurality of PLBs for combining into a combined PLB may be updated with the updated average compression per active virtual.

In another example implementation, a computer program product resides on a computer readable medium that has a plurality of instructions stored on it. When executed by a processor, the instructions cause the processor to perform operations that may include, but are not limited to, receiving a plurality of physical layer blocks (PLBs). A subset of PLBs may be selected from the plurality of PLBs for combining into a combined PLB based upon, at least in part, a utilization of each PLB of the plurality of PLBs, an average compression per active virtual, and a number of free PLBs generated when combining into the combined PLB. One or more PLBs of the subset of PLBs may be compressed based upon, at least in part, the average compression per active virtual. The one or more PLBs of the subset of PLBs may be combined into the combined PLB.

One or more of the following example features may be included. A plurality of active virtuals may be configured to map to each PLB. The utilization of each PLB may be based upon, at least in part, the number of active virtuals mapping to each PLB. Selecting a subset of PLBs from the plurality of PLBs for combining into a combined PLB may include maximizing the number of free PLBs generated when combining into the combined PLB. Compressing one or more PLBs of the subset of PLBs based upon, at least in part, the average compression per active virtual may include compressing a first PLB from the subset of PLBs; determining the average compression per active virtual based upon, at least in part, the compression of the first PLB; selecting a candidate PLB from the subset of PLBs for combining into the combined PLB based upon, at least in part the average compression per active virtual and a remaining capacity of the combined PLB, thus defining a second PLB; compressing the second PLB; determining an updated average compression per active virtual based upon, the compression of the second PLB; and combining the compressed first PLB and the compressed second PLB into the combined PLB. Candidate PLBs may be iteratively selected and compressed from the subset of PLBs based upon, at least in part, the remaining capacity of the combined PLB. The average compression per active virtual used for selecting the subset of PLBs from the plurality of PLBs for combining into a combined PLB may be updated with the updated average compression per active virtual.

In another example implementation, a computing system includes at least one processor and at least one memory architecture coupled with the at least one processor, wherein the at least one processor is configured to receive a plurality of physical layer blocks (PLBs). The at least one processor is further configured to select a subset of PLBs from the plurality of PLBs for combining into a combined PLB based upon, at least in part, a utilization of each PLB of the plurality of PLBs, an average compression per active virtual, and a number of free PLBs generated when combining into the combined PLB. The at least one processor is further configured to compress one or more PLBs of the subset of PLBs based upon, at least in part, the average compression per active virtual. The at least one processor is further configured to combine the one or more PLBs of the subset of PLBs into the combined PLB.

One or more of the following example features may be included. A plurality of active virtuals may be configured to map to each PLB. The utilization of each PLB may be based upon, at least in part, the number of active virtuals mapping to each PLB. Selecting a subset of PLBs from the plurality of PLBs for combining into a combined PLB may include maximizing the number of free PLBs generated when combining into the combined PLB. Compressing one or more PLBs of the subset of PLBs based upon, at least in part, the average compression per active virtual may include compressing a first PLB from the subset of PLBs; determining the average compression per active virtual based upon, at least in part, the compression of the first PLB; selecting a candidate PLB from the subset of PLBs for combining into the combined PLB based upon, at least in part the average compression per active virtual and a remaining capacity of the combined PLB, thus defining a second PLB; compressing the second PLB; determining an updated average compression per active virtual based upon, the compression of the second PLB; and combining the compressed first PLB and the compressed second PLB into the combined PLB. Candidate PLBs may be iteratively selected and compressed from the subset of PLBs based upon, at least in part, the remaining capacity of the combined PLB. The average compression per active virtual used for selecting the subset of PLBs from the plurality of PLBs for combining into a combined PLB may be updated with the updated average compression per active virtual.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
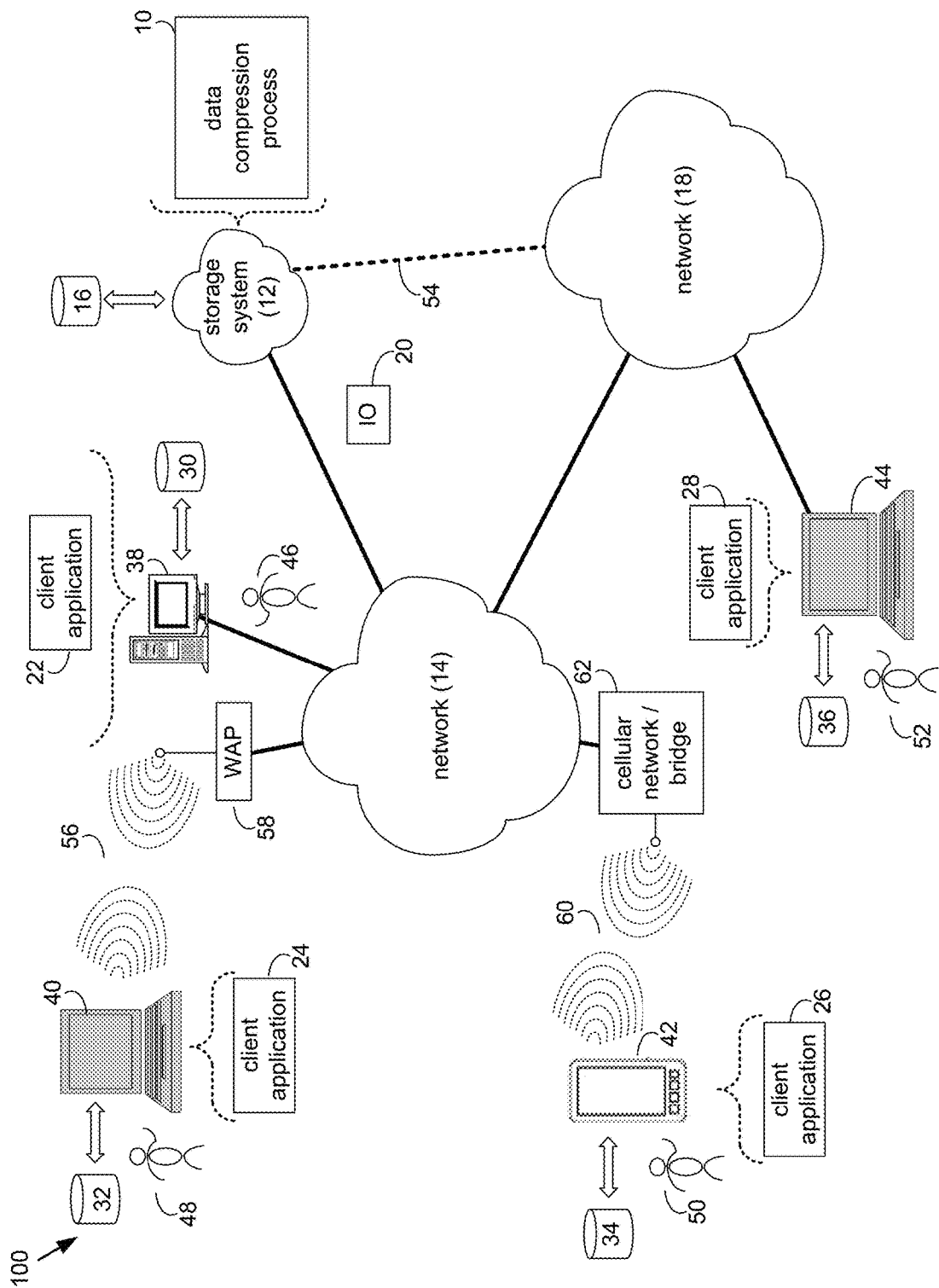
FIG. 1 is an example diagrammatic view of a storage system and a data compression process coupled to a distributed computing network according to one or more example implementations of the disclosure.

System Overview:

Referring to FIG. 1, there is shown data compression process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of data compression process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of data compression process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11 a, 802.11 b, 802.11 g, 802.11 n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a data compression process, such as data compression process 10 of FIG. 1, may include but is not limited to, receiving a plurality of physical layer blocks (PLBs). A subset of PLBs may be selected from the plurality of PLBs for combining into a combined PLB based upon, at least in part, a utilization of each PLB of the plurality of PLBs, an average compression per active virtual, and a number of free PLBs generated when combining into the combined PLB. One or more PLBs of the subset of PLBs may be compressed based upon, at least in part, the average compression per active virtual. The one or more PLBs of the subset of PLBs may be combined into the combined PLB.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
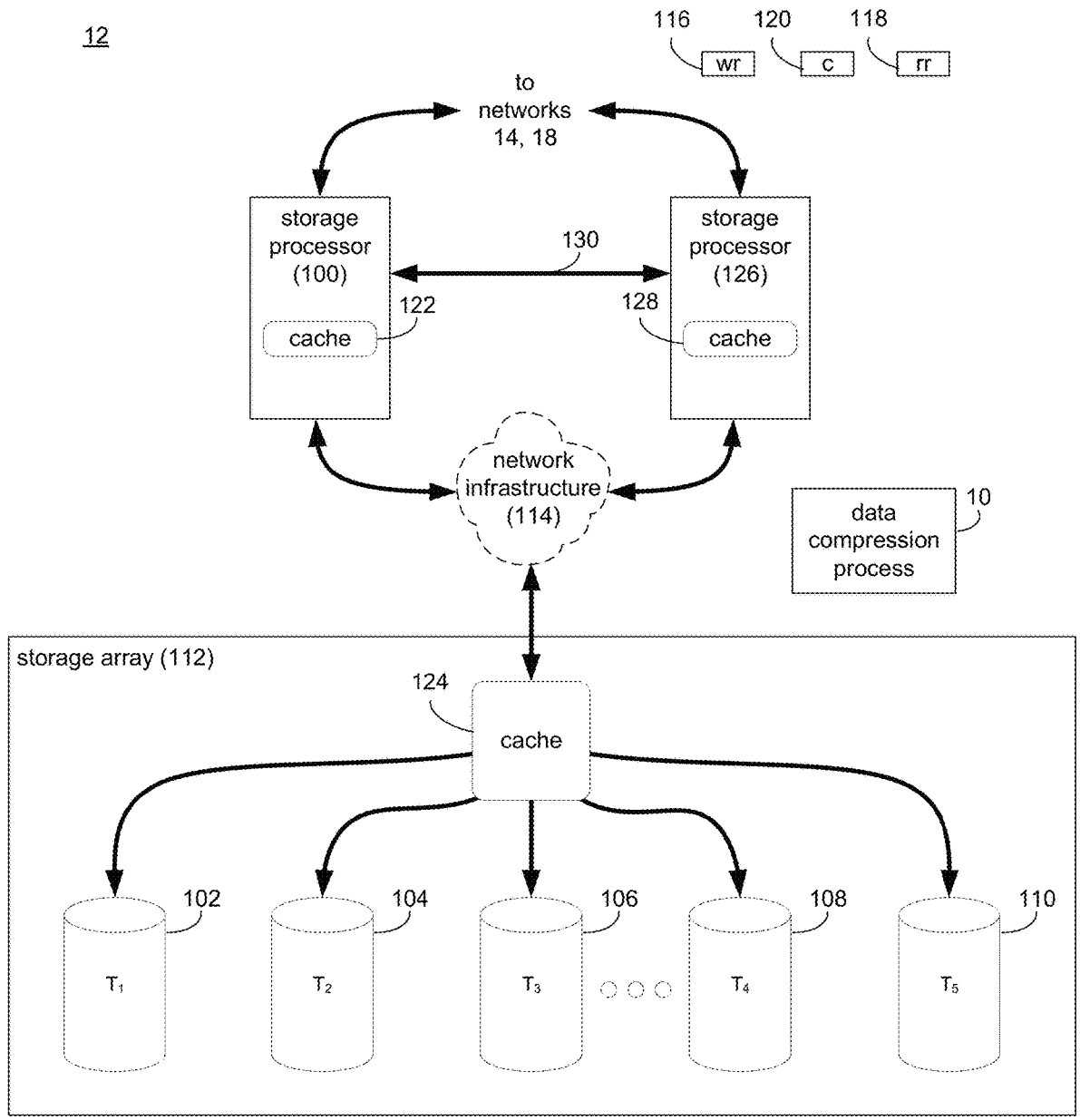
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of data compression process 10. The instruction sets and subroutines of data compression process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of data compression process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of data compression process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of data compression process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Metadata Architecture:

In the context of storage systems, metadata may generally include useful internal information managed by a storage array to describe and locate user data. All modern arrays abstract the physical media and present logical (virtualized) addresses to clients in the form of LUNs. The mapping between the logical address and physical address is a form of metadata that the array needs to manage. That's typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a Block to the Physical Location of the Block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/IOPs than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
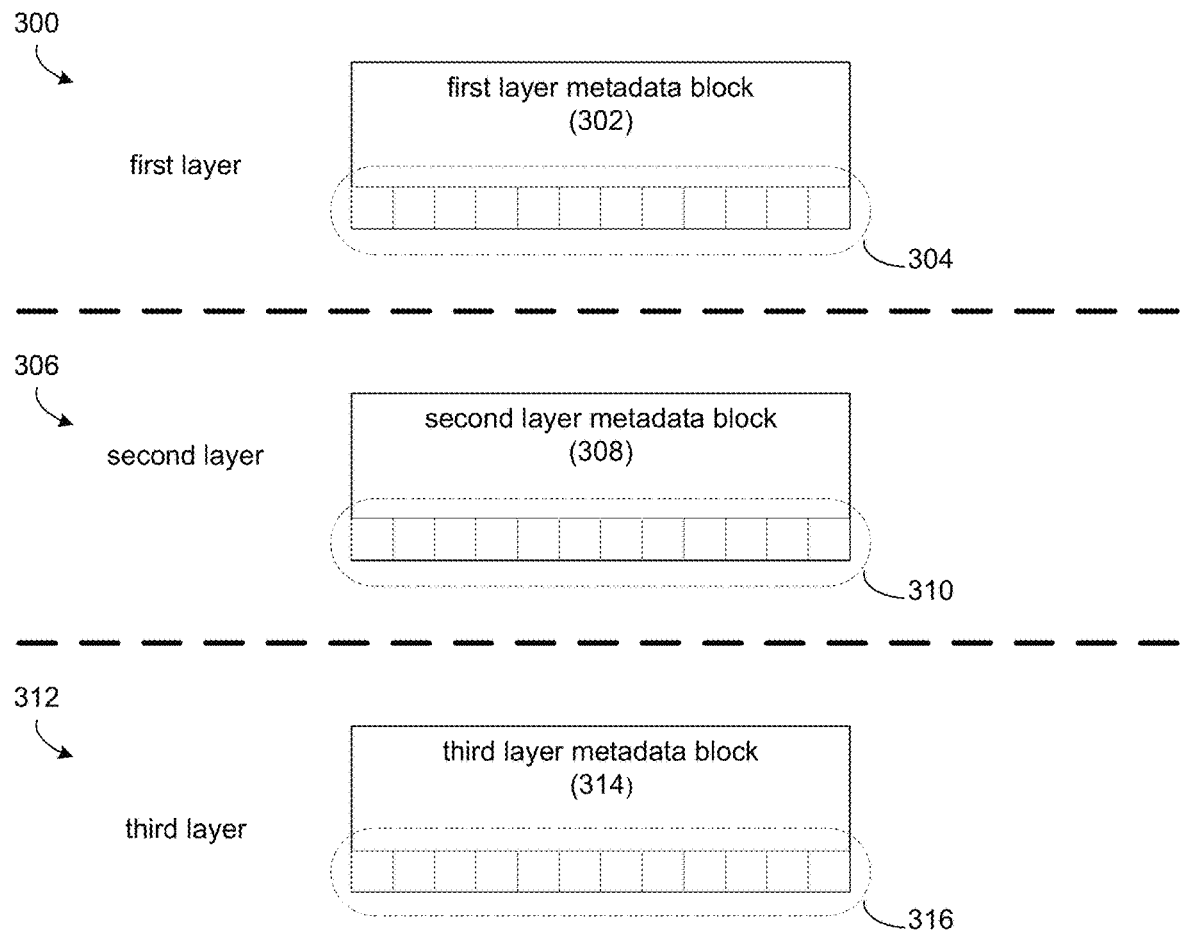
Figure 4:
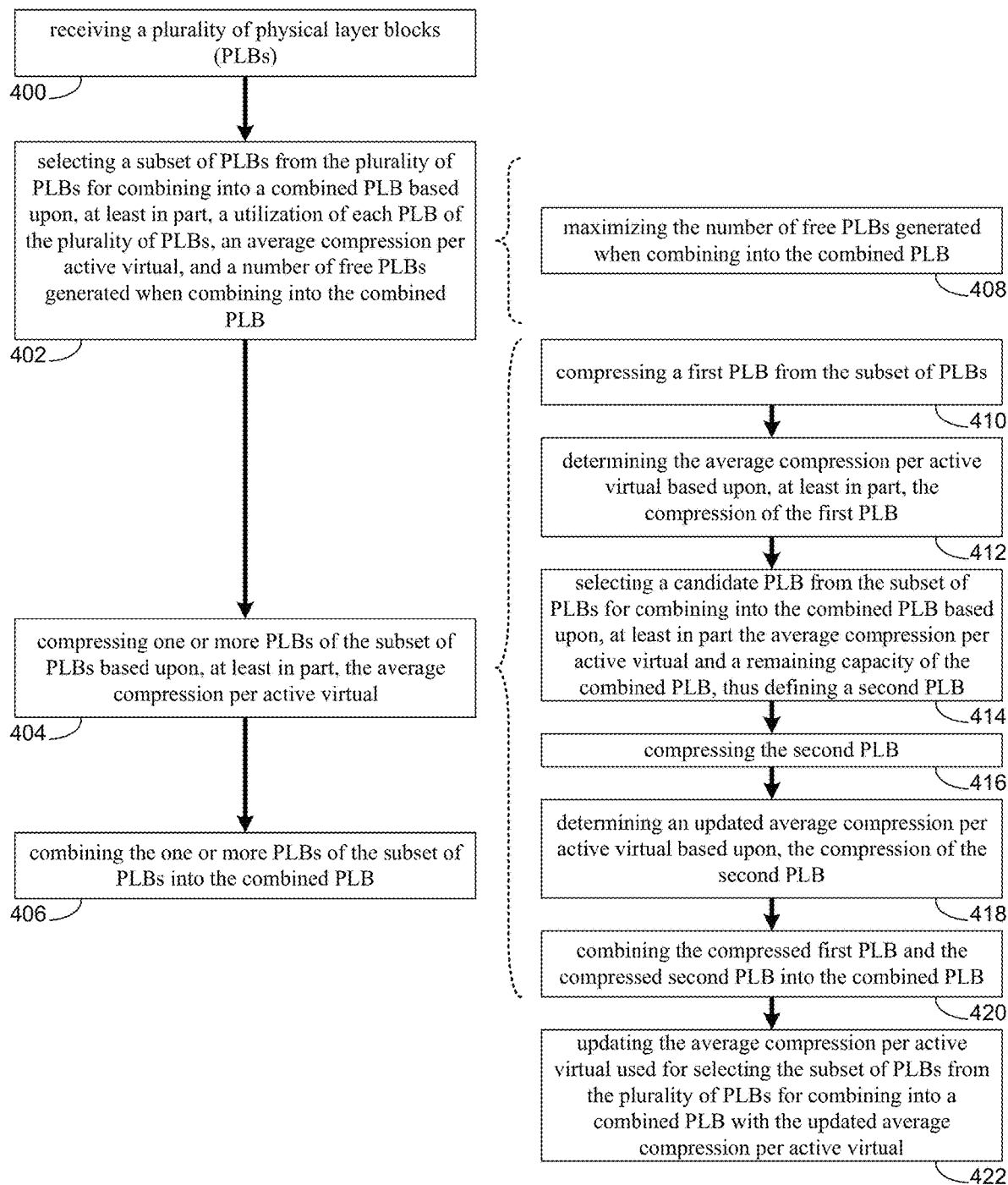
FIG. 4 is an example flowchart of the data compression process of FIG. 1 according to one or more example implementations of the disclosure.

Referring also to FIG. 3, a storage system may generally include three layers of metadata blocks. While the following example includes metadata "blocks", it will be appreciated that other units of data storage may be used within the scope of the present disclosure. In some implementations, a first layer (e.g., first layer 300) may include first layer metadata blocks (e.g., first layer metadata block 302) with a plurality of entries (e.g., plurality of entries 304) that map or point to a plurality of entries of one or more second layer metadata blocks. The first layer may (e.g., first layer 300) represent various ranges of Logical Block Addresses (LBAs). For example, each entry of the plurality of entries (e.g., plurality of entries 304) of the first layer metadata blocks (e.g., first layer metadata block 302) may be associated with a LBA range. In some implementations, the first layer (e.g., first layer 300) may be organized in a "tree" data structure where each "leaf" of the "tree" data structure corresponds to a specific LBA range. Accordingly, each first layer metadata block (e.g., first layer metadata block 302) may hold mapping of a LBA to a second layer metadata block. As will be discussed in greater detail below, these first layer metadata blocks may be referred to as "virtuals" that, when pointing to data within a third layer metadata block, may be referred to as "active virtuals". For example, a virtual or first layer metadata block may be a e.g., 4 kilobyte page. As will be discussed in greater detail below, each virtual may map to user data within a third layer metadata block, via a second layer metadata block.

In some implementations, a second layer (e.g., second layer 306) may include second layer metadata blocks (e.g., second layer metadata block 308) with a plurality of entries (e.g., plurality of entries 310) that map to a plurality of entries of one or more third layer metadata blocks. The second layer (e.g., second layer 306) may generally isolate the logical address of a block from the physical location of the block. For example, a second layer metadata block (e.g., second layer metadata block 308) may encapsulate the physical location of user data and allow relocation without updating first layer metadata blocks (e.g., first layer metadata block 302). Accordingly, the second layer (e.g., second layer 306) may decouple the Logical Block Address space address from the physical one. As will be discussed in greater detail below, second layer metadata blocks (e.g., second layer metadata block 308) may be stored in a storage array (e.g., on one of storage targets 102, 104, 106, 108 of storage array 112). In some implementations, each second layer metadata block may be referred to as a "virtual layer block" or "VLB".

In some implementations, a third layer (e.g., third layer 312) may include third layer metadata blocks (e.g., third layer metadata block 314) with a plurality of entries or portions (e.g., plurality of entries 316) that are configured to store user data. In this manner, the third layer (e.g., third layer 312) may describe the physical location of user data in a storage system. In some implementations, each third layer metadata block (e.g., third layer metadata block 314) may have a predefined amount of storage capacity for storing metadata (e.g., user data). For example, each third layer metadata block may hold e.g., 2 megabytes (MB) of user data that may be referenced by a second layer metadata block. As will be discussed in greater detail below, third layer metadata blocks (e.g., third layer metadata block 314) may be stored in a storage array (e.g., on one of storage targets 102, 104, 106, 108 of storage array 112). In some implementations, each third layer metadata block may be referred to as a "physical layer block" or "PLB".

The Data Compression Process:

Referring also to FIGS. 4-7 and in some implementations, data compression process 10 may receive 400 a plurality of physical layer blocks (PLBs). A subset of PLBs may be selected 402 from the plurality of PLBs for combining into a combined PLB based upon, at least in part, a utilization of each PLB of the plurality of PLBs, an average compression per active virtual, and a number of free PLBs generated when combining into the combined PLB. One or more PLBs of the subset of PLBs may be compressed 404 based upon, at least in part, the average compression per active virtual. The one or more PLBs of the subset of PLBs may be combined 406 into the combined PLB.

In some implementations, data compression process 10 may allow for the efficient selection, compression, and combination of physical layer blocks (PLBs) within a storage system. For example and as discussed above, in a log structured file system, data may be written or persisted to a log structure before flushing the data to persistent storage. However, limitations in the bandwidth of the log may become a bottleneck for processing operations on a storage system. Conventional approaches seek to resolve this by writing data to the log with minimal processing on the data. For example, conventional approaches delay data reduction operations until the data is persisted. However, these approaches typically perform compression and deduplication separately. As will be discussed in greater detail below, implementations of the present disclosure may select, compress, and combine persistent data to maximize the storage space in physical layer blocks and to create more free storage resources.

Figure 5:
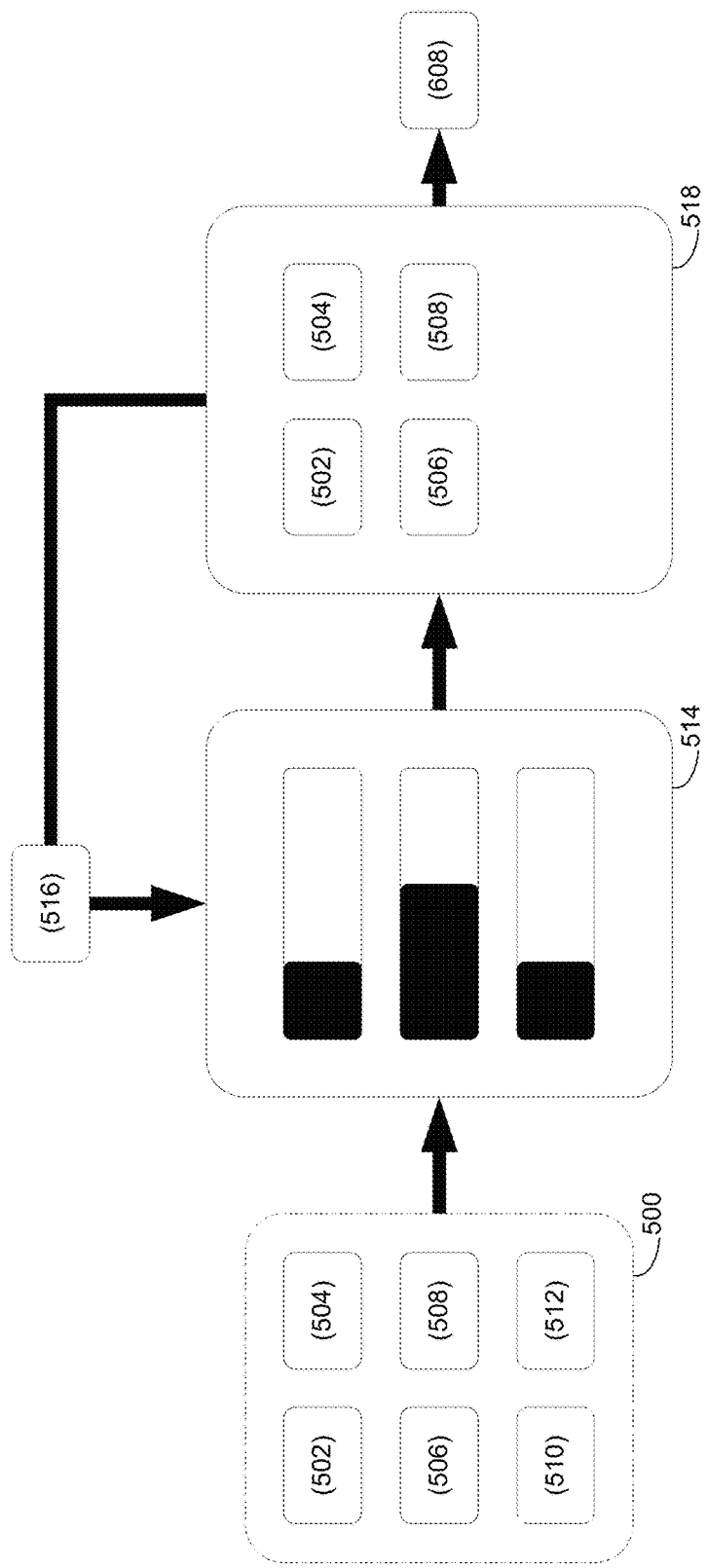
FIGS. 5-7 are example diagrammatic views of the data compression process of FIG. 1 according to one or more example implementations of the disclosure.

In some implementations, data compression process 10 may receive 400 a plurality of physical layer blocks (PLBs). As discussed above, a PLB may be a third layer metadata block (e.g., third layer metadata block 314) that is configured to store user data. In some implementations, each PLB may include a predefined amount of storage capacity (e.g., 2 MB). While an example of e.g., 2 MB has been provided, it will be appreciated that PLBs may be of any size or storage capacity within the scope of the present disclosure. Referring also to FIG. 5, data compression process 10 may receive 400 a plurality of PLBs (e.g., plurality of PLBs 500, including PLBs 502, 504, 506, 508, 510, 512). While plurality of PLBs 500 is shown to include e.g., six PLBs, it will be appreciated that this is for example purposes only and that data compression process 10 may receive 400 any number of PLBs within the scope of the present disclosure.

In some implementations and as discussed above, a plurality of active virtuals may be configured to map to each PLB. Referring again to FIG. 3, a virtual or first layer metadata block (e.g., first layer metadata block 302) may be configured to "point" or map to one or more second layer metadata blocks (e.g., second layer metadata block 308) or virtual layer blocks (VLBs). In one example, each PLB may include a predefined storage capacity (e.g., 2 MB). As discussed above, a virtual or first layer metadata block may be considered "active" if the virtual maps to a PLB. In some implementations, a virtual may have a storage capacity of e.g., 4 KB. Accordingly, each PLB may include the data of e.g., 512 active virtuals (i.e., 512 active virtuals*4 KB=2 MB). In this manner, a plurality of active virtuals (e.g., 512 active virtuals) may be configured to map to each PLB. In some implementations, each PLB may have a single VLB "pointing" to it where the plurality of active virtuals may map to a VLB which maps to the PLB (e.g., as shown in FIG. 3 through a three layer metadata block configuration).

The utilization of each PLB may be based upon, at least in part, the number of active virtuals mapping to each PLB. For example and as discussed above, given the predefined capacity associated with a PLB (e.g., 2 MB) and the predefined capacity associated with an active virtual (e.g., 4 KB), a utilization or utilized capacity of each PLB may be in terms of storage capacity (e.g., occupied storage space/total storage capacity) or in terms of the number of active virtuals (e.g., number of active virtuals/maximum number of active virtuals possible). As will be discussed in greater detail below, data compression process 10 may use the utilization of each PLB to determine which PLBs to select for compressing and combining to form new combined PLBs and freeing up underutilized PLBs.

In some implementations, data compression process 10 may select 402 a subset of PLBs from the plurality of PLBs for combining into a combined PLB based upon, at least in part, a utilization of each PLB of the plurality of PLBs, an average compression per active virtual, and a number of free PLBs generated when combining into the combined PLB. Referring again to FIG. 5, data compression process 10 may select 402 particular PLBs for combining into a combined PLB. For example, data compression process 10 may organize the plurality of PLBs into a plurality of PLB queues based upon, at least in part, the utilization of each PLB. As discussed above, PLB utilization may be represent in terms of used storage capacity or number of active virtuals. As shown in FIG. 5, data compression process 10 may determine the utilization of each PLB and add each PLB to a plurality of PLB queues (e.g., plurality of PLB queues 514) based upon, at least in part, the utilization of each PLB. For example, data compression process 10 may define any number of PLB queues. In one example, data compression process 10 may define a PLB queue for various utilization thresholds (e.g., 10% utilization; 20% utilization; 30% utilization, etc.). The defining of PLB queues may be predetermined (e.g., a default number of PLB queues for predefined utilization thresholds) and/or may be automatically determined by data compression process 10 (e.g., in response to receiving 400 a plurality of PLBs and modeling the distribution of PLBs). However, it will be appreciated that data compression process 10 may define the number and threshold of each PLB queue in various ways within the scope of the present disclosure.

Selecting 402 a subset of PLBs from the plurality of PLBs for combining into a combined PLB may include maximizing 408 the number of free PLBs generated when combining into the combined PLB. For example, data compression process 10 may select 402 PLBs for combining into a combined PLB based upon, at least in part, the utilization of each PLB, the average compression per active virtual, and the number of free PLBs generated when combining into the combined PLB. The average compression per active virtual (e.g., average compression per active virtual 516) may generally include the compression rate as a function of active virtuals. For example, data compression process 10 may utilize the average compression per active virtual (e.g., average compression per active virtual 516) to select 402 particular PLBs from the plurality of PLBs (e.g., plurality of PLBs 500). Data compression process 10 may utilize the average compression per active virtual (e.g., average compression per active virtual 516) to maximize 408 the number of free PLBs generated when combining into the combined PLB. For example, suppose the storage capacity of the combined PLB is e.g., 2 MB and that the average compression per active virtual (e.g., average compression per active virtual 516) is e.g., "n":1, where n is a natural number. In this example, data compression process 10 may maximize 408 the number of free PLBs generated when combining into the combined PLB by selecting 402 a subset of PLBs whose sum of uncompressed size is n*2 MB. In this manner, data compression process 10 may select 402 the maximum number of PLBs whose sum of uncompressed size is n*2 MB. While the example storage capacity of 2 MB has been discussed, it will be appreciated that any storage capacity may be used within the scope of the present disclosure.

Figure 6:
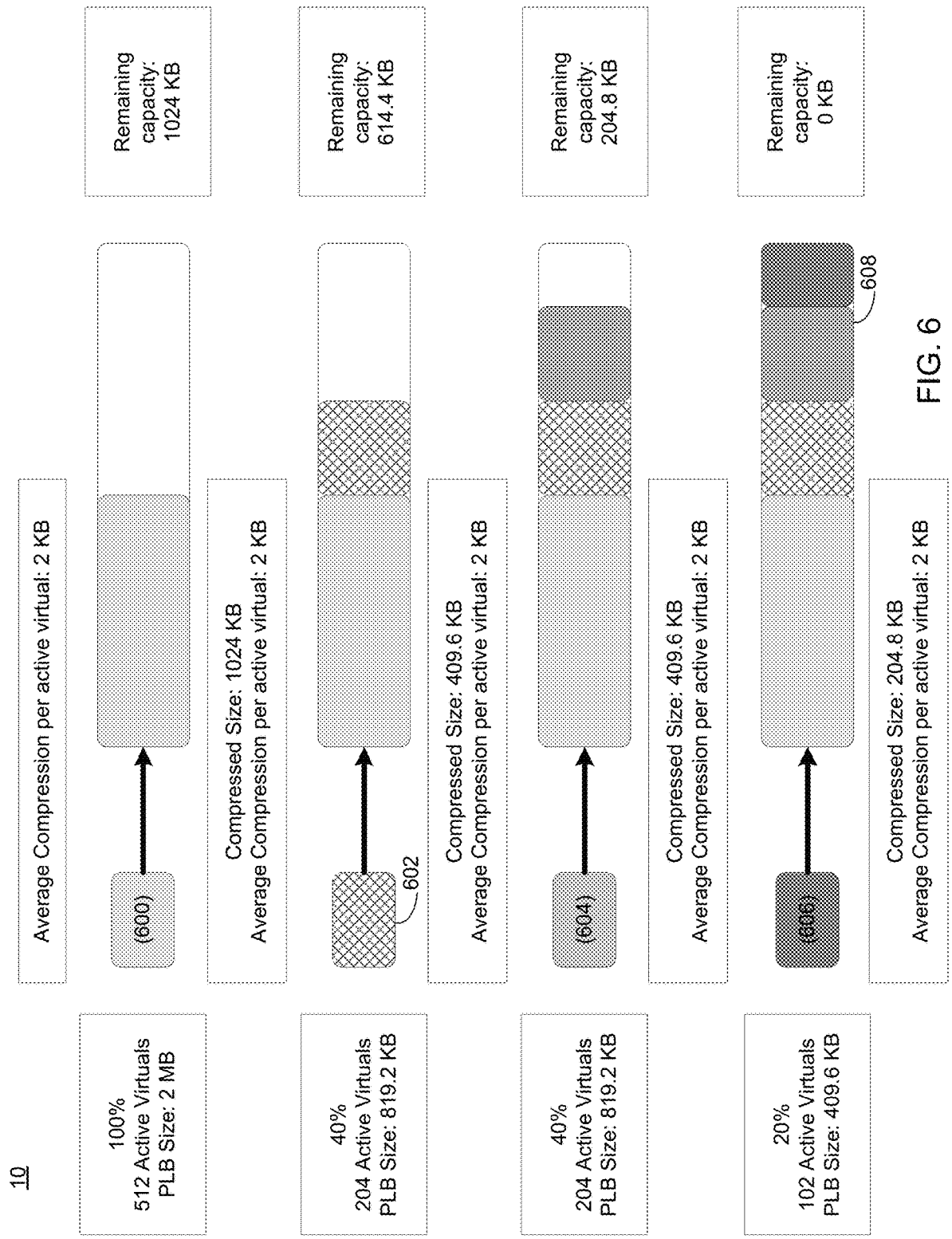

In some implementations, data compression process 10 may compress 404 one or more PLBs of the subset of PLBs based upon, at least in part, the average compression per active virtual. For example and referring also to FIG. 6, suppose data compression process 10 selects 402 a subset of PLBs (e.g., PLBs 600, 602, 604, 606) for combining into a combined PLB. As shown in FIG. 6, suppose PLB 600 has a utilization of e.g., 512 active virtuals (100%); PLB 602 has a utilization of e.g., 204 active virtuals (40%); PLB 604 has a utilization of e.g., 204 active virtuals (40%); and PLB 606 has a utilization of e.g., 102 active virtuals (20%). It will be appreciated that these values are for example purposes only and that data compression process 10 may select 402 any number or combination of PLBs within the scope of the present disclosure.

Compressing 404 one or more PLBs of the subset of PLBs based upon, at least in part, the average compression per active virtual may include: compressing 410 a first PLB from the subset of PLBs; determining 412 the average compression per active virtual based upon, at least in part, the compression of the first PLB; selecting 414 a candidate PLB from the subset of PLBs for combining into the combined PLB based upon, at least in part the average compression per active virtual and a remaining capacity of the combined PLB, thus defining a second PLB; compressing 416 the second PLB; determining 418 an updated average compression per active virtual based upon, the compression of the second PLB; and combining 420 the compressed first PLB and the compressed second PLB into the combined PLB. Referring again to FIG. 6, suppose that the average compression per active virtual is e.g., 2:1 or 2 KB (i.e., 4 KB/2 KB=2). In this example, data compression process 10 may compress 410 a first PLB (e.g., PLB 600). As shown in FIG. 6, data compression process 10 may compress 410 PLB 600 from e.g., 2048 KB to e.g., 1024 KB.

Data compression process 10 may determine the average compression per active virtual based upon, at least in part, the compression of the first PLB. In this example, data compression process 10 may determine 412 the average compression per active virtual by averaging the compression rate per active virtual following the compression of PLB 600 (e.g., 2 KB (previous compression rate per active virtual)+2 KB (current compression rate per active virtual: 1024 KB/512 active virtuals=2)/2=2 KB).

Data compression process 10 may select 414 a candidate PLB from the subset of PLBs for combining into the combined PLB based upon, at least in part the average compression per active virtual and a remaining capacity of the combined PLB, thus defining a second PLB. For example, following the compression of PLB 600, the remaining capacity of combined PLB 608 is e.g., 1024 KB. Accordingly, data compression process 10 may select 414 a candidate PLB from the subset of PLBs (e.g., PLBs 602, 604, 606) based upon, at least in part, the average compression per active virtual (e.g., 2 KB) and the remaining capacity of the combined PLB (e.g., 1024 KB). In this example, suppose data compression process 10 selects 414 PLB 602 with e.g., 204 active virtuals as the second PLB. Data compression process 10 may compress 416 the second PLB (e.g., PLB 602). Suppose that data compression process 10 is able to compress PLB 602 from e.g., 819.2 KB to e.g., 409.6 KB. Data compression process 10 may determine if the compressed second PLB (e.g., compressed PLB 602) exceeds the remaining capacity of combined PLB 608. If so, data compression process 10 may select 414 a different PLB from the subset of PLBs and repeat as discussed above. If not, data compression process 10 may combine compressed PLB 602 with compressed PLB 600. Data compression process 10 may determine 418 an updated average compression per active virtual based upon, the compression of the second PLB. For example, data compression process 10 may determine 418 the updated average compression per active virtual by averaging the compression rate per active virtual following the compression of PLB 602 (e.g., 2 KB (previous compression rate per active virtual)+2 KB (current compression rate per active virtual: 419.6 KB/204(.8) active virtuals=2)/2=2 KB).

Data compression process 10 may iteratively select 414 and compress 416 candidate PLBs from the subset of PLBs based upon, at least in part, the remaining capacity of the combined PLB. For example, data compression process 10 may determine that the remaining capacity for combined PLB 608 is e.g., 614.4 KB. In this example, data compression process 10 may select 414 a candidate PLB from the subset of PLBs (e.g., PLBs 604, 606) based upon, at least in part, the average compression per active virtual (e.g., 2 KB) and the remaining capacity of the combined PLB (e.g., 614.4 KB). In this example, suppose data compression process 10 selects 414 PLB 604 with e.g., 204 active virtuals as a third PLB. Data compression process 10 may compress 416 the third PLB (e.g., PLB 604). Suppose that data compression process 10 is able to compress PLB 604 from e.g., 819.2 KB to e.g., 409.6 KB. Data compression process 10 may determine if the compressed third PLB (e.g., compressed PLB 604) exceeds the remaining capacity of combined PLB 608. If so, data compression process 10 may select 414 a different PLB from the subset of PLBs and repeat as discussed above. If not, data compression process 10 may combine 420 compressed PLB 604 with compressed PLBs 600, 602. Data compression process 10 may determine 418 an updated average compression per active virtual based upon, the compression of the third PLB. For example, data compression process 10 may determine 418 the updated average compression per active virtual by averaging the compression rate per active virtual following the compression of PLB 604 (e.g., 2 KB (previous compression rate per active virtual)+2 KB (current compression rate per active virtual: 409.6 KB/204(.8) active virtuals=2)/2=2 KB).

In response to combining compressed PLB 604, data compression process 10 may determine that the remaining capacity for combined PLB 608 is e.g., 204.8 KB. In this example, data compression process 10 may select 414 a candidate PLB from the subset of PLBs (e.g., PLB 606) based upon, at least in part, the average compression per active virtual (e.g., 2 KB) and the remaining capacity of the combined PLB (e.g., 204.8 KB). In this example, suppose data compression process 10 selects 414 PLB 606 with e.g., 102 active virtuals as a fourth PLB. Data compression process 10 may compress 416 the fourth PLB (e.g., PLB 606). Suppose that data compression process 10 is able to compress PLB 606 from e.g., 409.6 KB to e.g., 204.8 KB. Data compression process 10 may determine if the compressed fourth PLB (e.g., compressed PLB 606) exceeds the remaining capacity of combined PLB 608. If so, data compression process 10 may select 414 a different PLB from the subset of PLBs and repeat as discussed above. If not, data compression process 10 may combine 420 compressed PLB 606 with compressed PLBs 600, 602, 604. Data compression process 10 may determine 418 an updated average compression per active virtual based upon, the compression of the fourth PLB. For example, data compression process 10 may determine 418 the updated average compression per active virtual by averaging the compression rate per active virtual following the compression of PLB 606 (e.g., 2 KB (previous compression rate per active virtual)+2 KB (current compression rate per active virtual: 204.8 KB/102(.4) active virtuals=2)/2=2 KB).

In some implementations, data compression process 10 may combine 406 the one or more PLBs of the subset of PLBs into the combined PLB. For example, data compression process 10 may determine that all of the PLBs of the subset of PLBs have been combined and/or because the remaining capacity is less than some threshold. Accordingly, data compression process 10 may combine PLBs 600, 602, 604, 606 to generate combined PLB 608 and may free PLBs 600, 602, 604, 606 for processing new user data.

Data compression process 10 may update 422 the average compression per active virtual used for selecting the subset of PLBs from the plurality of PLBs for combining into a combined PLB with the updated average compression per active virtual. Continuing with the above example, suppose that data compression process 10 determines the updated average compression per active virtual is e.g., 2 KB. In this example and as shown in FIG. 5, data compression process 10 may update 422 the average compression per active virtual (e.g., average compression per active virtual 516) used for selecting the subset of PLBs from the plurality of PLBs for combining into a combined PLB with the updated average compression per active virtual (e.g., 2 KB). In this manner, data compression process 10 may adapt to changes in PLB compression.

Figure 7:
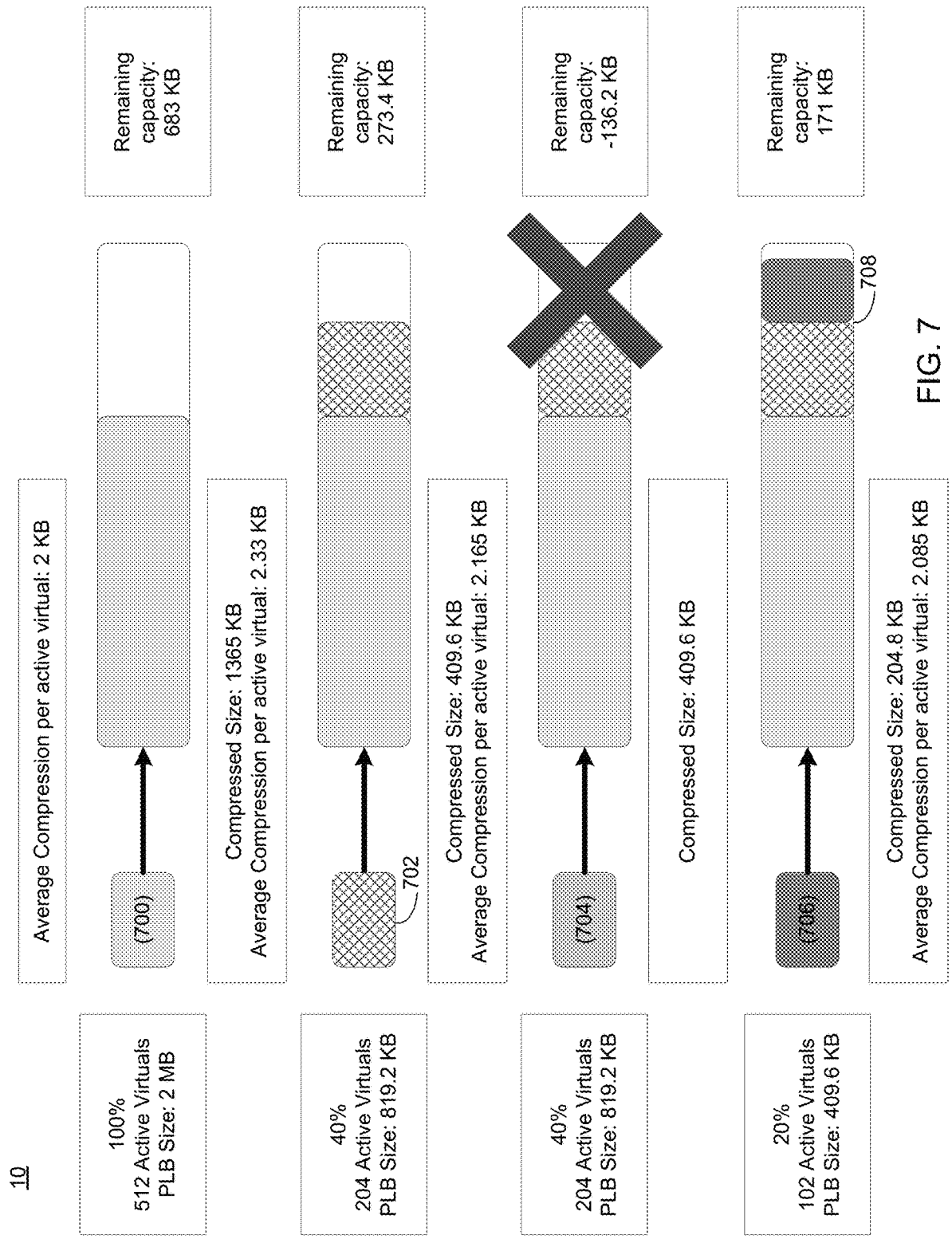

For example and referring also to FIG. 7, suppose that the average compression per active virtual is e.g., 2:1 or 2 KB (i.e., 4 KB/2 KB=2). In this example, data compression process 10 may compress 410 a first PLB (e.g., PLB 700). However, suppose that data compression process 10 is only able to compress 410 PLB 700 from e.g., 2048 KB to e.g., 1365 KB (e.g., 1365 KB/512 active virtuals). In this example, data compression process 10 may determine 412 the average compression per active virtual by averaging the compression rate per active virtual following the compression of PLB 700 (e.g., 2 KB (previous compression rate per active virtual)+2.66 KB (current compression rate per active virtual)/2=2.33 KB).

Following the compression of PLB 700, the remaining capacity of combined PLB 708 is e.g., 683 KB. Accordingly, data compression process 10 may select 414 a candidate PLB from the subset of PLBs (e.g., PLBs 702, 704, 706) based upon, at least in part, the average compression per active virtual (e.g., 2.33 KB) and the remaining capacity of the combined PLB (e.g., 683 KB). In this example, suppose data compression process 10 selects 414 PLB 702 with e.g., 204 active virtuals as the second PLB. Data compression process 10 may compress 416 the second PLB (e.g., PLB 702). Suppose that data compression process 10 is able to compress PLB 702 from e.g., 819.2 KB to e.g., 409.6 KB. Data compression process 10 may determine if the compressed second PLB (e.g., compressed PLB 702) exceeds the remaining capacity of combined PLB 708. If so, data compression process 10 may select 414 a different PLB from the subset of PLBs and repeat as discussed above. If not, data compression process 10 may combine 420 compressed PLB 702 with compressed PLB 700. Data compression process 10 may determine 418 an updated average compression per active virtual based upon, the compression of the second PLB. For example, data compression process 10 may determine 418 the updated average compression per active virtual by averaging the compression rate per active virtual following the compression of PLB 702 (e.g., 2.33 KB (previous compression rate per active virtual)+2 KB (current compression rate per active virtual)/2=2.165 KB).

Data compression process 10 may iteratively select 414 and compress 416 candidate PLBs from the subset of PLBs based upon, at least in part, the remaining capacity of the combined PLB. For example, data compression process 10 may determine that the remaining capacity for combined PLB 708 is e.g., 273.4 KB. In this example, data compression process 10 may select 414 a candidate PLB from the subset of PLBs (e.g., PLBs 704, 706) based upon, at least in part, the average compression per active virtual (e.g., 2.165 KB) and the remaining capacity of the combined PLB (e.g., 273.4 KB). In this example, suppose data compression process 10 selects 414 PLB 704 with e.g., 204 active virtuals as a third PLB. Data compression process 10 may compress 416 the third PLB (e.g., PLB 704). Suppose that data compression process 10 is able to compress PLB 704 from e.g., 819.2 KB to e.g., 409.6 KB. Data compression process 10 may determine if the compressed third PLB (e.g., compressed PLB 704) exceeds the remaining capacity of combined PLB 708. If so, data compression process 10 may select 414 a different PLB from the subset of PLBs and repeat as discussed above. If not, data compression process 10 may combine 420 compressed PLB 704 with compressed PLBs 700, 702. For example, data compression process 10 may determine that PLB 704 cannot be combined with combined PLB 708 (e.g., remaining capacity would be −136.2 KB).

In response to determining that PLB 704 cannot be combined with PLB 708, data compression process 10 may select 414 a candidate PLB from the subset of PLBs (e.g., PLB 706) based upon, at least in part, the average compression per active virtual (e.g., 2.165 KB) and the remaining capacity of the combined PLB (e.g., 273.4 KB). In this example, suppose data compression process 10 selects 414 PLB 706 with e.g., 102 active virtuals as a fourth PLB. Data compression process 10 may compress 416 the fourth PLB (e.g., PLB 706). Suppose that data compression process 10 is able to compress PLB 706 from e.g., 409.6 KB to e.g., 204.8 KB. Data compression process 10 may determine if the compressed fourth PLB (e.g., compressed PLB 706) exceeds the remaining capacity of combined PLB 708. If so, data compression process 10 may select 414 a different PLB from the subset of PLBs and repeat as discussed above. If not, data compression process 10 may combine 420 compressed PLB 706 with compressed PLBs 700, 702. Data compression process 10 may determine 418 an updated average compression per active virtual based upon, the compression of the second PLB. For example, data compression process 10 may determine 418 the updated average compression per active virtual by averaging the compression rate per active virtual following the compression of PLB 706 (e.g., 2.165 KB (previous compression rate per active virtual)+2 KB (current compression rate per active virtual)/2=2.085 KB).

In some implementations, data compression process 10 may combine 420 the one or more PLBs of the subset of PLBs into the combined PLB. For example, data compression process 10 may determine that all of the PLBs of the subset of PLBs have been combined and/or because the remaining capacity is less than some threshold. Accordingly, data compression process 10 may combine PLBs 700, 702, 706 to generate combined PLB 708 and may free PLBs 700, 702, 706 for processing new user data. PLB 706 may be returned to the plurality of PLB queues for future processing. In this example, data compression process 10 may adapt to changes in compression of particular PLBs when combining PLBs. In this manner, data compression process 10 may improve the process of selecting, compressing, and combining PLBs by accounting for changes or individual PLB compression results when combining compressed PLBs.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
receiving a plurality of physical layer blocks (PLBs);
selecting a subset of PLBs from the plurality of PLBs for combining into a combined PLB based upon, at least in part, a utilization of each PLB of the plurality of PLBs, an average compression per active virtual, and a number of free PLBs generated when combining into the combined PLB;

compressing one or more PLBs of the subset of PLBs based upon, at least in part, the average compression per active virtual; and combining the one or more PLBs of the subset of PLBs into the combined PLB.

2. The computer-implemented method of claim 1, wherein a plurality of active virtuals are configured to map to each PLB.

3. The computer-implemented method of claim 2, wherein the utilization of each PLB is based upon, at least in part, the number of active virtuals mapping to each PLB.

4. The computer-implemented method of claim 1, wherein selecting a subset of PLBs from the plurality of PLBs for combining into a combined PLB includes:

maximizing the number of free PLBs generated when combining into the combined PLB.

5. The computer-implemented method of claim 1, wherein compressing one or more PLBs of the subset of PLBs based upon, at least in part, the average compression per active virtual includes:

compressing a first PLB from the subset of PLBs;

determining the average compression per active virtual based upon, at least in part, the compression of the first PLB;

selecting a candidate PLB from the subset of PLBs for combining into the combined PLB based upon, at least in part the average compression per active virtual and a remaining capacity of the combined PLB, thus defining a second PLB;

compressing the second PLB;

determining an updated average compression per active virtual based upon, the compression of the second PLB; and combining the compressed first PLB and the compressed second PLB into the combined PLB.

6. The computer implemented method of claim 5, further comprising:

iteratively selecting and compressing candidate PLBs from the subset of PLBs based upon, at least in part, the remaining capacity of the combined PLB.

7. The computer implemented method of claim 5, further comprising:

updating the average compression per active virtual used for selecting the subset of PLBs from the plurality of PLBs for combining into a combined PLB with the updated average compression per active virtual.

8. A computer program product residing on a non-transitory computer readable medium having a plurality of instructions stored thereon which, when executed by a processor, cause the processor to perform operations comprising:

receiving a plurality of physical layer blocks (PLBs);

selecting a subset of PLBs from the plurality of PLBs for combining into a combined PLB based upon, at least in part, a utilization of each PLB of the plurality of PLBs, an average compression per active virtual, and a number of free PLBs generated when combining into the combined PLB;

compressing one or more PLBs of the subset of PLBs based upon, at least in part, the average compression per active virtual; and combining the one or more PLBs of the subset of PLBs into the combined PLB.

9. The computer program product of claim 8, wherein a plurality of active virtuals are configured to map to each PLB.

10. The computer program product of claim 9, wherein the utilization of each PLB is based upon, at least in part, the number of active virtuals mapping to each PLB.

11. The computer program product of claim 8, wherein selecting a subset of PLBs from the plurality of PLBs for combining into a combined PLB includes:

maximizing the number of free PLBs generated when combining into the combined PLB.

12. The computer program product of claim 8, wherein compressing one or more PLBs of the subset of PLBs based upon, at least in part, the average compression per active virtual includes:

compressing a first PLB from the subset of PLBs;

determining the average compression per active virtual based upon, at least in part, the compression of the first PLB;

selecting a candidate PLB from the subset of PLBs for combining into the combined PLB based upon, at least in part the average compression per active virtual and a remaining capacity of the combined PLB, thus defining a second PLB;

compressing the second PLB;

determining an updated average compression per active virtual based upon, the compression of the second PLB; and combining the compressed first PLB and the compressed second PLB into the combined PLB.

13. The computer program product of claim 12, wherein the operations further comprise:

iteratively selecting and compressing candidate PLBs from the subset of PLBs based upon, at least in part, the remaining capacity of the combined PLB.

14. The computer program product of claim 13, wherein the operations further comprise:

updating the average compression per active virtual used for selecting the subset of PLBs from the plurality of PLBs for combining into a combined PLB with the updated average compression per active virtual.

15. A computing system comprising:

a memory; and a processor configured to receiving a plurality of physical layer blocks (PLBs), wherein the processor is further configured to select a subset of PLBs from the plurality of PLBs for combining into a combined PLB based upon, at least in part, a utilization of each PLB of the plurality of PLBs, an average compression per active virtual, and a number of free PLBs generated when combining into the combined PLB, wherein the processor is further configured to compress one or more PLBs of the subset of PLBs based upon, at least in part, the average compression per active virtual, and wherein the processor is further configured to combine the one or more PLBs of the subset of PLBs into the combined PLB.

16. The computing system of claim 15, wherein a plurality of active virtuals are configured to map to each PLB.

17. The computing system of claim 16, wherein the utilization of each PLB is based upon, at least in part, the number of active virtuals mapping to each PLB.

18. The computing system of claim 15, wherein selecting a subset of PLBs from the plurality of PLBs for combining into a combined PLB includes:

maximizing the number of free PLBs generated when combining into the combined PLB.

19. The computing system of claim 15, wherein compressing one or more PLBs of the subset of PLBs based upon, at least in part, the average compression per active virtual includes:
- compressing a first PLB from the subset of PLBs;
- determining the average compression per active virtual based upon, at least in part, the compression of the first PLB;
- selecting a candidate PLB from the subset of PLBs for combining into the combined PLB based upon, at least in part the average compression per active virtual and a remaining capacity of the combined PLB, thus defining a second PLB;
- compressing the second PLB;
- determining an updated average compression per active virtual based upon, the compression of the second PLB; and
- combining the compressed first PLB and the compressed second PLB into the combined PLB.

20. The computing system of claim 19, wherein the processor is further configured to:
- iteratively select and compress candidate PLBs from the subset of PLBs based upon, at least in part, the remaining capacity of the combined PLB.

* * * * *